United States Patent [19]

Willi et al.

[11] Patent Number: 4,541,495

[45] Date of Patent: Sep. 17, 1985

[54] WEIGHING APPARATUS OF THE VIBRATORY STRING TYPE

[75] Inventors: Ernst Willi, Oberdürnten; Hans-Ulrich Flückiger, Hombrechtikon, both of Switzerland

[73] Assignee: Mettler Instrumente AG, Greifensee, Switzerland

[21] Appl. No.: 575,949

[22] Filed: Feb. 1, 1984

[30] Foreign Application Priority Data

Apr. 26, 1983 [CH] Switzerland .......................... 2224/83

[51] Int. Cl.[4] .............................................. G01G 3/16
[52] U.S. Cl. .................................. 177/210 FP; 73/580
[58] Field of Search ............. 177/210 FP, 210 R, 244; 73/1 DV, 579, 580, DIG. 1; 84/1.16

[56] References Cited

U.S. PATENT DOCUMENTS 3,325,579  6/1967  Cookerly et al. ................ 84/1.16
4,058,007  11/1977  Exner ........................ 73/DIG. 1 X
4,378,702  4/1983  Meier ........................ 73/DIG. 1 X Primary Examiner—Thomas H. Tarcza
Assistant Examiner—Fred L. Kampe
Attorney, Agent, or Firm—Laubscher & Laubscher

[57] ABSTRACT

A weighing apparatus of the vibratory string type is disclosed, wherein a current-carrying string connected intermediate its ends between a movable load-responsive member and a frame vibrates in a magnetic field produced by a permanent magnet mounted on the frame. The ends of the string extend beyond the clamping connections with the movable member and the frame, respectively, for electrical connection with the conductors to the string drive and load detection circuit. This driving and detection circuit and the aforementioned conductors are mounted on a printed circuit board that is connected with the frame, thereby to avoid the need of a separate power supply with its disadvantageous effect on string vibrations. In one modification, the protruding string end associated with the movable member comprises a tension spring for prestressing the string.

7 Claims, 3 Drawing Figures

WEIGHING APPARATUS OF THE VIBRATORY STRING TYPE

BRIEF DESCRIPTION OF THE PRIOR ART

Weighing or force-measuring systems of the vibratory string type are well known in the patented prior art, as evidenced, for example, by the Riordan et al U.S. Pat. No. 3,465,597, and Meier U.S. Pat. Nos. 3,779,072, 3,897,681 and 4,378,702. The weighing apparatus includes a load-or force-responsive member connected for movement relative to a frame, the vibratory string being connected between the movable member and the frame, whereby the detection of variations in the string vibrating frequency affords a measurement of the load or force applied to the movable member.

To achieve a high degree of measurement accuracy in such force or load measurement systems, efforts have been made, by means of improved isolation or decoupling of the string from the associated parts (i.e., the frame and the movable force-transmitting member), to achieve a high vibration quality of the string with sharp resonance. Suitable measures for this isolation or decoupling, for example, are described in U.S. Pat. No. 3,779,072. These measures however relate exclusively to the construction of the string.

An additional problem in this regard is represented by the means for supplying the electrical driving power to the string. One customarily uses for this purpose thin, flexible wires which are connected to the ends of the string, for example, by soldering, as indicated by way of example in U.S. Pat. Nos. 3,465,597 (FIG. 6) and 4,378,702 (FIG. 3), whereby, in the first case, the connecting point is provided before the clamping point, and, in the second case, behind. A certain attenuation of the string vibration due to the power supply means is unavoidable above all in case of a connection placed before the clamping point, that is to say, within the regions of the string which are stressed in terms of force, even if decoupling means are provided between the active part of the string and the connecting point.

The connecting points represent a disadvantage furthermore by virtue of their transition resistances which, in the electrical substitute circuit of the string vibrator, form a series resistance that determines the increase in the resonance frequency. Here, the connecting points of the wires to the electrical drive and detecting system, for example, on the current paths of a circuit board, must also be considered. In order to achieve a high degree of resonance elevation which will remain constant in series production, the series resistance must be as small and as constant as possible. These prerequisites, however, as we know are difficult to comply with as a rule when use is made of a soldered joint, especially when dealing with the connection of thin wires, in other words, rather small-surface soldering points and when, as customary, lacquer-insulated wires must be used. Besides, power supply lines of this kind are easily vulnerable and are not at all suitable for efficient manufacture.

The present invention was developed to avoid the above and other drawbacks of the known weighing systems.

SUMMARY OF THE INVENTION

A primary object of the present invention is to provide an improved weighing or force-measuring apparatus of the vibratory string type including a string that is connected at spaced locations intermediate its ends with the movable load-or force-responsive member and the stationary frame, respectively, the free ends of the string which project beyond the clamping means being utilized for connection with the conductors of the string driving and detection circuit, which is mounted on a circuit board that is attached to the frame. Preferably, the projecting string ends are soldered to the electrical conductors leading to the drive and load detecting means.

Owing to the elimination of separate power supply conductors, one can considerably reduce and stabilize the transition resistances, especially if the string ends in the electrical connection sector are made in the form of a broad surface relative to the cross-sectional dimensions of the string.

For the manufacture of the strings designed according to the invention, punch-or stamped-bending technique is particularly suitable with a view to series production (as disclosed in U.S. Pat. No. 4,378,702), because no separate work operation is required for the formation of the power supply facility. The attachment of the string ends to the circuit board conductors or the contacts, respectively, can be accomplished in a comparatively simple manner, and can readily be included in one preferably automatic soldering process encompassing the entire circuit board.

Power supply connections made in this manner are distinguished by a defined low series resistance and great stability. Reactions on the measurement system can be kept within certain predefined limits owing to the identically constant shape of the power supply facilities.

In past designs of the force measurement arrangement, a spring engaging the mobile force transmission member is usually employed for prestressing the string. Within the context of the present invention there is now the possibility of making the string end, which has been extended beyond the clamping point at the movable force-transmission member, at the same time in the form of a tension spring for the prestressing of the string. In this way, the use of a separate tension spring can be eliminated, and that further simplifies the structure of the force measurement arrangement. A particularly stable design in this connection can be obtained if an attachment means, provided for the attachment of the circuit board to the frame, for example, a screw connection, at the same time serves for the attachment of the string end, which is made in the form of a tension spring, to the circuit board.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
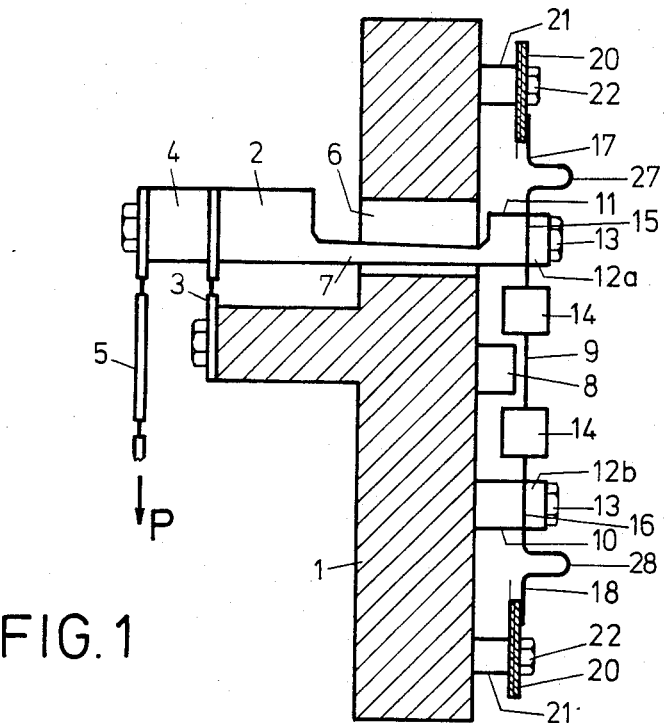
FIG. 1 is a partly sectioned side elevational view illustrating the weighing apparatus of the present invention.
Figure 2:
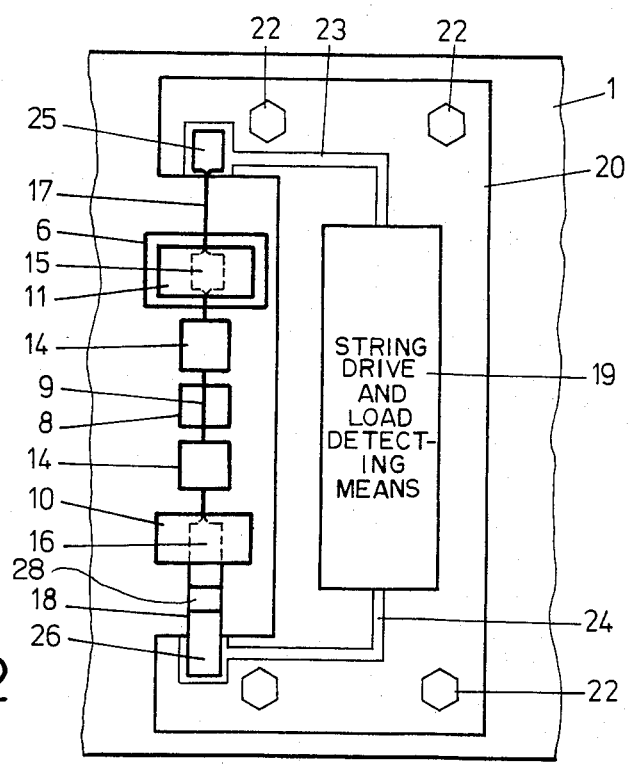
FIG. 2 is a front elevational view of the apparatus of FIG. 1.

Referring first more particularly to FIGS. 1 and 2, the weighing apparatus is of the vibratory string type that is disclosed, for example, in the companion Meier U.S. application Ser. No. 453,103 filed Dec. 27, 1982 now U.S. Pat. No. 4,497,386) and consequently only certain major parts illustrative of the weighing apparatus have been shown.

Pivotally connected for movement relative to stationary frame 1 is a two-armed lever 2 which is supported intermediate its ends by a leaf spring type resilient bearing 3. One lever arm 4 is adapted for receiving the load P via guide means 5, and the other lever arm 7 extends through an opening 6 contained in the frame. Mounted on the remote side of the frame relative to the bearing 3 is a stationary magnet 8 which is part of electromagnet means for driving the vertically arranged vibratory metal string 9. Intermediate its ends, the upper and lower parts of the string 9 are clamped by screws 13 and clamping plates 12a and 12b with the projecting free end 11 of lever 2 and with stationary lug 10 on the frame, respectively. The vibratory string is provided with conventional nodal masses 14 (which are known in the art, as shown, for example, by the U.S. Pat. No. 4,378,702). Preferably the string is widened at these upper and lower clamping points 15 and 16, respectively, as shown in FIG. 2.

In accordance with a characterizing feature of the present invention, the end portions 17 and 18 of the string 9 extend upwardly and downwardly beyond the clamping points 15 and 16, respectively, thereby affording means for connecting the string with the conventional string drive and load detecting means 19. More particularly, the driving and detecting means 19 includes an oscillator which cooperates with permanent magnet 8 to drive the string at a given operating frequency. Variations in this oscillating frequency produced as a function of the load P to be measured are detected, and the magnitude of the load is indicated by a load display means (not shown). The electronic string drive and load detecting circuit 19 is mounted on a circuit board 20 that is connected with the frame by means of bolts 22 and mounting lugs 21.

The string ends 17 and 18 that extend beyond the clamping means 12a and 12b are electrically connected with the drive and detecting circuit 19 via printed circuit conductors 23 and 24, respectively. The string ends 17 and 18 terminate in widened terminal portions 25 and 26 that are soldered to the conductors 23 and 24, respectively. If desired, instead of soldered connections, the string ends could be connected with the conductors by conventional screw means. To avoid any undue influence on the measuring system and the application of mechanical stresses on the soldered connections to the power supply, the protruding string end portions 17 and 18 are in an unstretched or untensioned condition, as achieved, for example, by providing the protruding portions with bends 27 and 28, respectively. Thus, the end portion 17 connected with the movable member 2 is preferably in the form of a relatively flexible spring and is relatively thin, while the projecting other end 18 is of the same width as the widened clamping portion 16 and the widened connecting portion 26.

Figure 3:
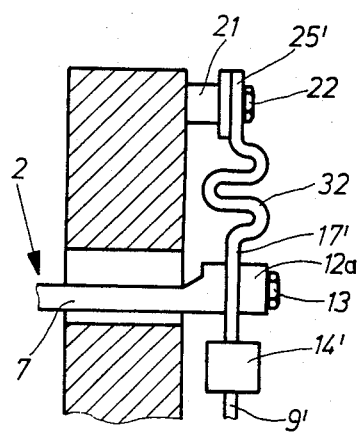
FIG. 3 is a detailed view of a modification of the apparatus of FIG. 1.

Referring now to the modification of FIG. 3, the upper protruding string end 17' may be in the form of a tension spring 32 for prestressing the string 9. The tension spring 32 may have a meandering configuration or, in the case of a flat measuring string, can have any other shape, such as a serpentine configuration, formed by punch bending techniques. In order to produce stabilized weighing conditions, the protruding string ends may be electrically connected with the circuit board conductors 23 and 24 by the use of the bolts 22 that connect the circuit board with the frame 1, whereby the use of soldered connections is avoided.

What is claimed is:
1. Weighing apparatus of the vibratory string type, comprising
   (a) a frame (1);
   (b) a movable load transmitting member (2) connected for movement relative to said frame;
   (c) a vibratory string (9);
   (d) clamping means (12a, 12b) for connecting spaced intermediate portions of said string with said movable member and with said frame, respectively, remote terminal ends (17, 18) of said string extending beyond said clamping means, respectively;
   (e) a printed circuit board (20);
   (f) means (21, 22) mounting said circuit board on said frame adjacent said string;
   (g) means (19) including an oscillator for vibrating said string and for detecting variations in the string frequency as a function of the load applied to said movable member, said vibrating and detecting means being mounted on said circuit board; and
   (h) means including a pair of electrical conductors (23, 24) mounted on said printed circuit board connecting, without wires, the terminal end portions of said string with said vibrating and detecting means, respectively.

2. Apparatus as defined in claim 1, wherein the terminal end portions of said string are soldered to said electrical conductors, respectively.

3. Apparatus as defined in claim 2, wherein said remote string ends are enlarged relative to the center string portion and have a generally rectangular cross section.

4. Apparatus as defined in claim 1, wherein said remote string ends comprise an unstretched portion.

5. Apparatus as defined in claim 4, wherein the end portion of the string that extends beyond said movable member is in the form of a spring having a high degree of resiliency.

6. In a weighing apparatus of the vibratory string type including a frame (1), a movable load transmitting member (2) connected for movement relative to the frame, a string (9) connected between said frame and said movable member, and means (19) for vibrating said string and for detecting variations in the string frequency as a function of the load applied to said movable member, the improvement wherein
   (a) clamping means (12a, 12b) are provided for connecting spaced intermediate portions of said string with said movable member and with said frame, respectively, the remote ends (17, 18) of said string extending beyond said clamping means, respectively, the end portion of the string that extends beyond said movable member being in the form of a tension spring operable to prestress said string;
   (b) a circuit board (20) upon which said vibrating and detecting means are mounted;
   (c) means (21, 22) mounting said circuit board on said frame; and
   (d) means (23, 24) electrically connecting said vibrating and detecting means with said remote string ends, respectively.

7. Apparatus as defined in claim 6, wherein said means for mounting said circuit board on said frame comprises at least one screw-threaded means (22) which is also operable to connect said tension spring to said circuit board.

* * * * *